United States Patent [19]

Yoshida

[11] Patent Number: 5,528,979
[45] Date of Patent: Jun. 25, 1996

[54] BREAD BAKING DEVICE

[75] Inventor: Shinji Yoshida, Daito, Japan

[73] Assignee: Funai Electric Co., Ltd., Daito, Japan

[21] Appl. No.: 411,979

[22] Filed: Mar. 28, 1995

[30]  Foreign Application Priority Data

May 18, 1994  [JP]  Japan .................................. 6-127108

[51] Int. Cl.⁶ .............................. A21B 1/00; A21D 8/00;
A47J 27/00; A47J 37/01
[52] U.S. Cl. ................ 99/327; 99/348; 99/468;
366/98; 366/146; 366/314; 366/601
[58] Field of Search ......................... 99/325–328, 329 R,
99/331–333, 337, 338, 348, 352, 353, 467,
468, 483, 484, 486; 366/69, 96–98, 144–147,
601, 314; 426/504, 512

[56]  References Cited

U.S. PATENT DOCUMENTS 4,538,509  9/1985  Ojima et al. ........................ 99/348
5,076,081  5/1991  Takahashi et al. ................... 99/327
5,415,081  5/1995  Yoshida et al. ..................... 99/326

*Primary Examiner*—Timothy F. Simone
*Attorney, Agent, or Firm*—Lackenbach Siegel Marzullo Aronson & Greenspan

[57]  ABSTRACT

A bread baking device enables automatic preheating of bread materials in the bread baking device provided with a bread baking oven (1), a bread baking vessel (13) installed in the baking oven (1), and the lid (3) openably installed on the baking oven, and by mixing raw ingredients to produce dough, and bakes bread after fermentation of the dough. The bread baking device includes a sensor (117) for detecting the temperature in the baking oven, a preheating control device (52a) heating the temperature in the baking oven to a pre-set temperature by comparing the detected temperature in the baking oven by applying the sensor.

4 Claims, 5 Drawing Sheets

$Tc > C1 > C2 > C3$

BREAD BAKING DEVICE

BACKGROUND OF THE INVENTION

The present invention relates to a home-use bread baking apparatus by which bread baking steps, including at least kneading materials and water to make a dough, preheating the dough, fermenting the dough and baking, are performed.

Up to the present, in home-use bread baking apparatuses generally, the method for placing the wheat flour, water, yeast and the like into the bread baking case provided in a closed vessel, for making dough by mixing the ingredients in the case, and finally for baking the dough after primary and secondary fermentation, is used. These bread baking apparatuses are constructed so as to begin the mixing process by pushing the start switch after the flour, water and yeast are placed in the bread baking case.

When beginning bread baking operation in these bread baking apparatuses at the prescribed time, it was common practice to keep the temperature of the oven at a pre-set temperature, for example close to 23° C., by applying the heater for the specified time by operating a setting button which starts operation at a pre-set time. Namely, even if the external temperature was lower than the aforementioned 23° C., by using this heating method, the mixing process in the oven begins from a pre-set temperature close to 23° C.

But in this type of bread baking device constructed as described above, users of the apparatus happen to push a starting switch button without operating the setting button, after placing the flour, water and yeast into the baking case.

In such a case, as the bread baking device immediately begins the mixing process non-relative to the condition in the temperature of the oven, even if the oven temperature is lower than 23° C., the time required to reach the optimal temperature in the mixing process (the temperature at which the gluten is well kneaded) differs depending on the initial oven temperature.

Consequently, the fermented dough differs in its volume and homogeneity, and accordingly, bread prepared lacks consistency in quality. Accordingly, the object of this invention is to provide a good bread baking apparatus by which bread of a consistently good quality can be prepared, even if it is used at room temperature not more than 23° C.

BRIEF DESCRIPTION OF THE INVENTION

For attaining the above-mentioned objects, a bread baking device provided with a bread baking case installed in a baking oven, and with a lid openably installed on the baking oven, in which a mixing step for kneading raw ingredients and water to make a dough, a fermentation step of the dough, and baking step are performed, comprising:

means for detecting a temperature in the baking oven; and a preheating control means which heats the oven to a pre-set temperature when the detected temperature is lower than that of the pre-set temperature, before starting the mixing step.

In the bread baking device according to the second embodiment of the present invention, the preheating control means is characterized by comprising:

a plurality of temperature ranges which in the upper value is limited to the pre-set temperature and successively decreases;

means for identifying a particular temperature range of the oven; and a heating means for determining the duty ratio or the current flow time corresponding to each of the temperature ranges and for heating the baking oven with the duty ratio or current flow time corresponding to each of the temperature ranges.

In the bread baking device according to the third embodiment of the present invention, the preheating control means heats the oven to the pre-set temperature, maintains the temperature of the oven for a certain period of time, and then starts the mixing step.

In the bread baking device according to the first embodiment of the present invention, when ingredients for making bread are placed into the bread baking case and the mixing start button is pushed down, the preheating control means installed in the bread baking device controls the preheating of the bread materials, in conformity with the detected temperature of the baking oven and the current flow data in the heater for heating the bread ingredients stored in the memory device of the control circuit, the preheat control means performs the current flow operation in the heater, then allows the temperature of the oven to rise to the pre-set temperature by comparing the temperature in the oven against the pre-set temperature (for example, 23° C.). When the temperature in the oven reaches the pre-set temperature, the mixing process is started.

In the bread baking device according to the second embodiment, when the mixing start button is pushed down, the judging means in the preheating control means identifies a particular temperature range of the oven out of a plurality of temperature ranges which in the upper value is limited to the pre-set temperature, and successively decreases; a heating means heats the oven to a pre-set temperature for a time period at a certain duty ratio which is provided based on the particularly identified temperature range, and the mixing step starts.

The lower the temperature of the oven is, the more the duty rate of the heater and the time period for heating are increased, and the temperature of the oven can be raised to the pre-set one for a short period.

DETAILED DESCRIPTION OF THE INVENTION

The embodiments of this invention will be described with reference to the drawings as follows.

Figure 1:
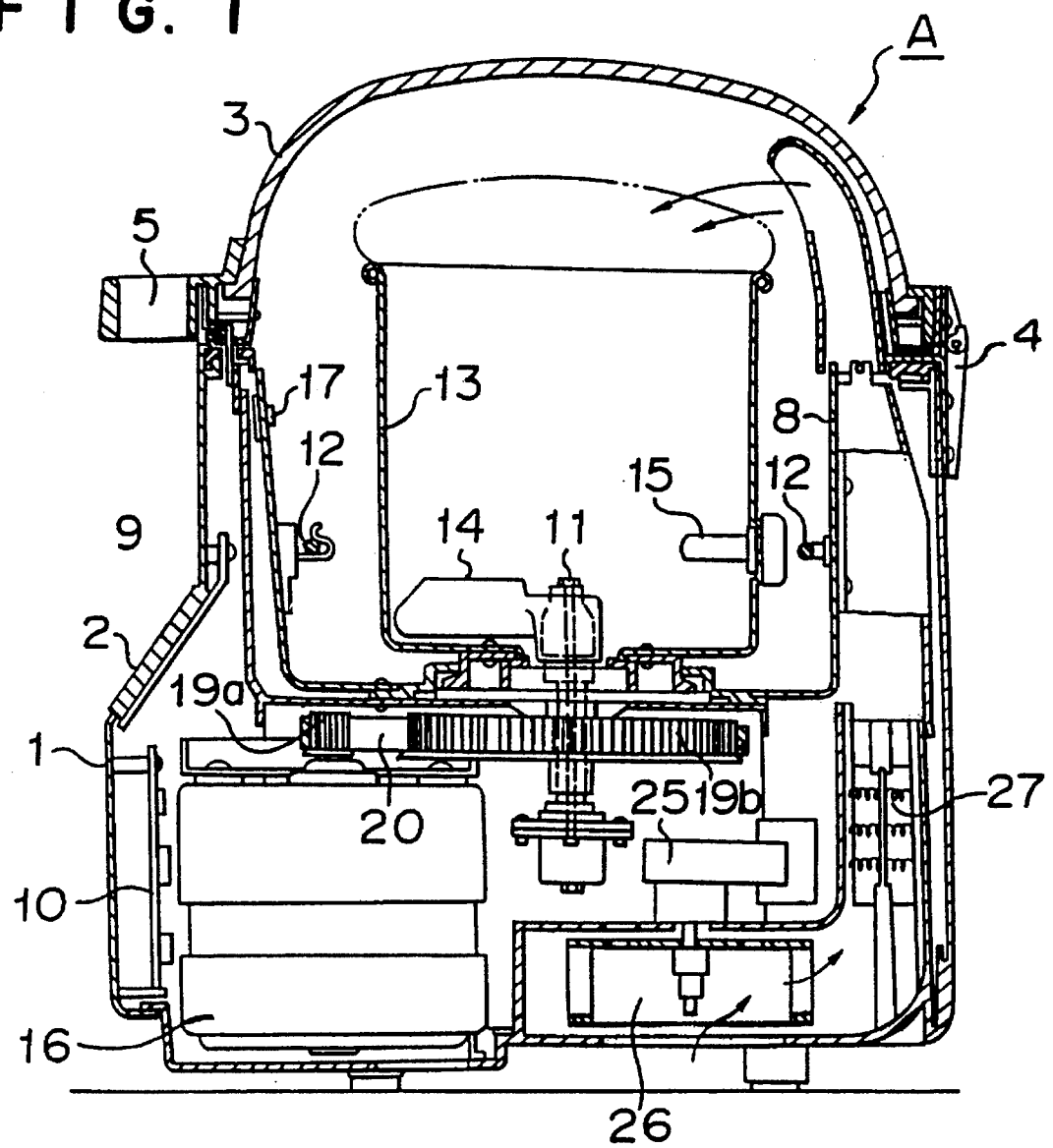
FIG. 1 shows a sectional view of an embodiment according to the present invention.
Figure 2:
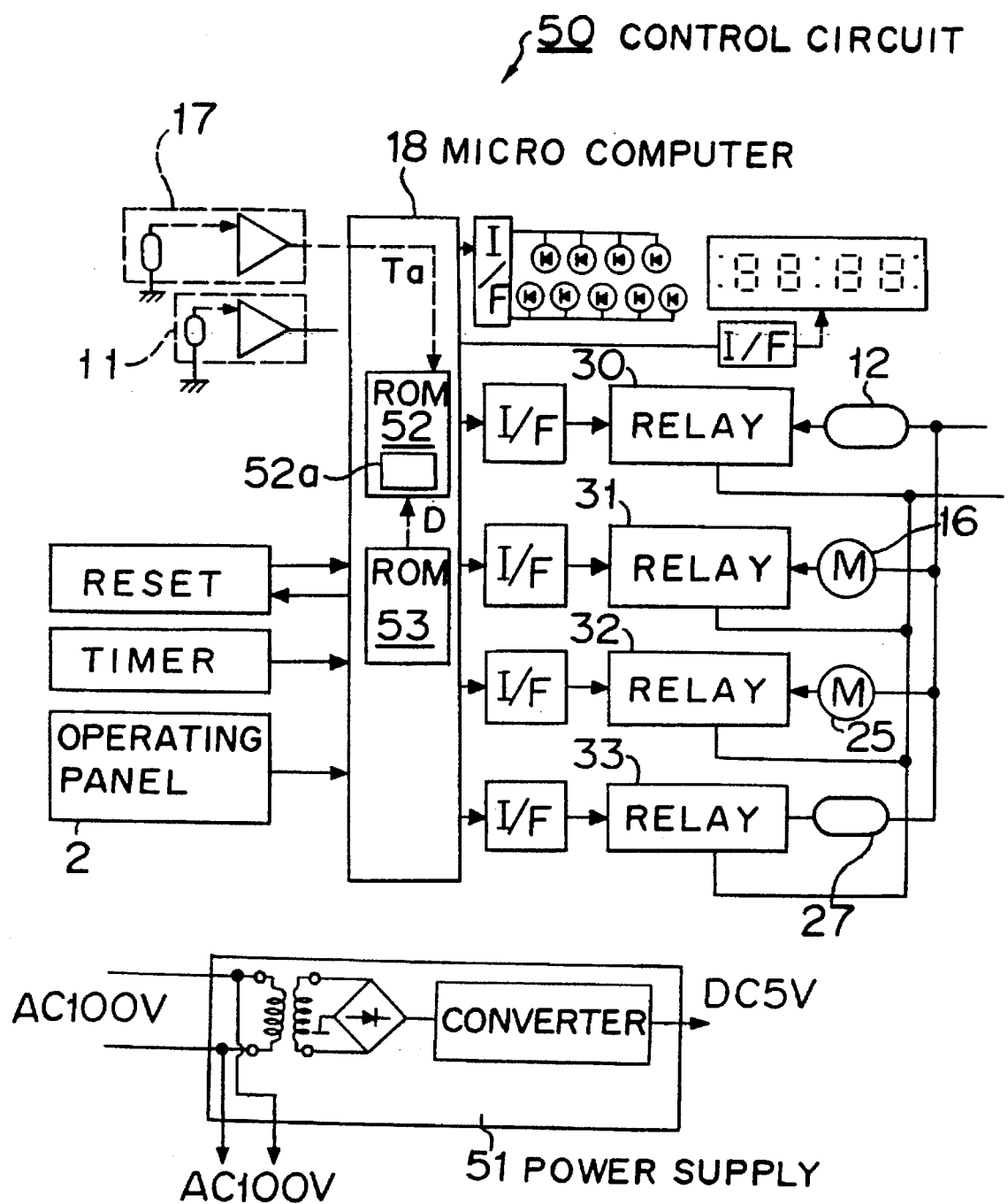
FIG. 2 shows a block diagram of a bread baking circuit shown in FIG. 1.

FIG. 1 shows a sectional view of the embodiment according to the present invention, and FIG. 2 is a block diagram of the control circuit of the bread baking device according to the present invention.

In FIG. 1 and FIG. 2, the construction of the bread baking device A according to the first embodiment of the present invention is described as follows.

Numeral 1 is a bread baking oven, numeral 2 is a control board provided on the center facial portion of the bread baking oven 1 for setting the prescribed time and for selecting the baking conditions, and numeral 3 is a dome-shaped lid made of glass installed openably on the upper portion of the bread baking vessel. An enclosed space of the bread baking device A is shaped with the bread baking oven 1 and the lid 3 made of glass. On the operating panel 2, a menu selection button, a menu setting button and a start button are installed. In this case, the glass lid 3 is made of transparent glass enabling a view of the inside of the bread baking oven 1 while the glass lid 3 is closed, the rear end thereof is rotatably installed on the bracket 4 installed on the bread baking oven 1, and a handle 5 for opening the glass lid 3 is installed on the front end of the bread baking oven 1.

In the inside of the bread baking oven 1, a cylindrically shaped inner container 8 is installed, and a display device for the operating panel 2, a control board 9 and a key input driver are also installed. A circuit board 10 controlling the total operation of the device as a whole is also provided.

On the internal periphery of the aforementioned inner container 8, a heat-radiating oven heater 12 equivalent to the electrical heating member is installed shaped in a ring form.

In the internal case 8, a cylindrical bread baking vessel 13 is upwardly installed, and a kneading blade 14 for mixing the ingredients, including the water, in bread baking vessel 13 is installed on the bottom of the case 13. A mixing motor 16 is installed on the lower portion of the baking oven 1, and the kneading blade 14 is driven by the mixing motor 16 through a pair of pulleys 19a, 19b and a timing belt 20.

An extruded bar-like body 15 is installed on the internal surface of the bread baking vessel 13 for preventing the co-rotation of the well-kneaded dough with the kneading blade 14.

A dough sensor 11 comprised of a thermister for temperature detection is installed on the kneading blade 14. An oven temperature sensor 17 for detecting baking temperature is provided on the external portion of the bread baking vessel 13.

On the circuit board 10 shown in FIG. 1, a circuit 50 which controls the entire bread baking device A is provided. The control circuit 50 is comprised with the blocked construction diagrams shown in FIG. 2. Numeral 18 is a microcomputer which controls the baking system as a whole, numeral 30 is a relay which activates the heating current of the oven heater 12. Numeral 33 is a relay which activates the heating current of the air blowing heater 27. Numerals 31 and 33 are relays which activate the mixing motor 16 and the fan motor 25.

The microcomputer 18 is provided with ROM and RAM for data memory, and further provided with I/O ports and A/D converters as the interfaces. The aforementioned ROMs are composed with the ROM 52 containing control programs related to performance of all bread baking processes, and the ROM 53 which memorizes referenced data.

In the ROM 52, a preheat control program 52a (equivalent to the preheat controlling means) is stored.

Numeral 51 is a power supply circuit of the bread baking device, and converts the alternative power to the direct power, which is supplied to the oven heater 12, the air blowing heater 27, the mixing motor 16, and the fan motor 25.

The bread baking process applied to the bread baking device according to this invention is described as follows. At first, a certain amount of ingredients for bread is put in the bread baking vessel 13, then the cover 3 is closed and the switch on the operating panel 2 is turned on. A control program for preheating means 52a (preheat control device) then starts to activate, and the preheating process controlling the current flow to the oven heater 12 from the power source 53 also begins.

Following the end of the preheating process, the mixing process begins. Namely, the ingredients are agitated by the rotation of the kneading blade 14, hot air heated by the air blowing heater 27 is forced to enter the bread baking vessel 13, and the operation proceeds to the mixing step and the dough is generated under the action of the dough sensor 11. After the mixing step is completed, the operation proceeds to the fermentation step, and after fermentation, the operation proceeds to the baking step under control of the oven temperature sensor 17.

Figure 3:
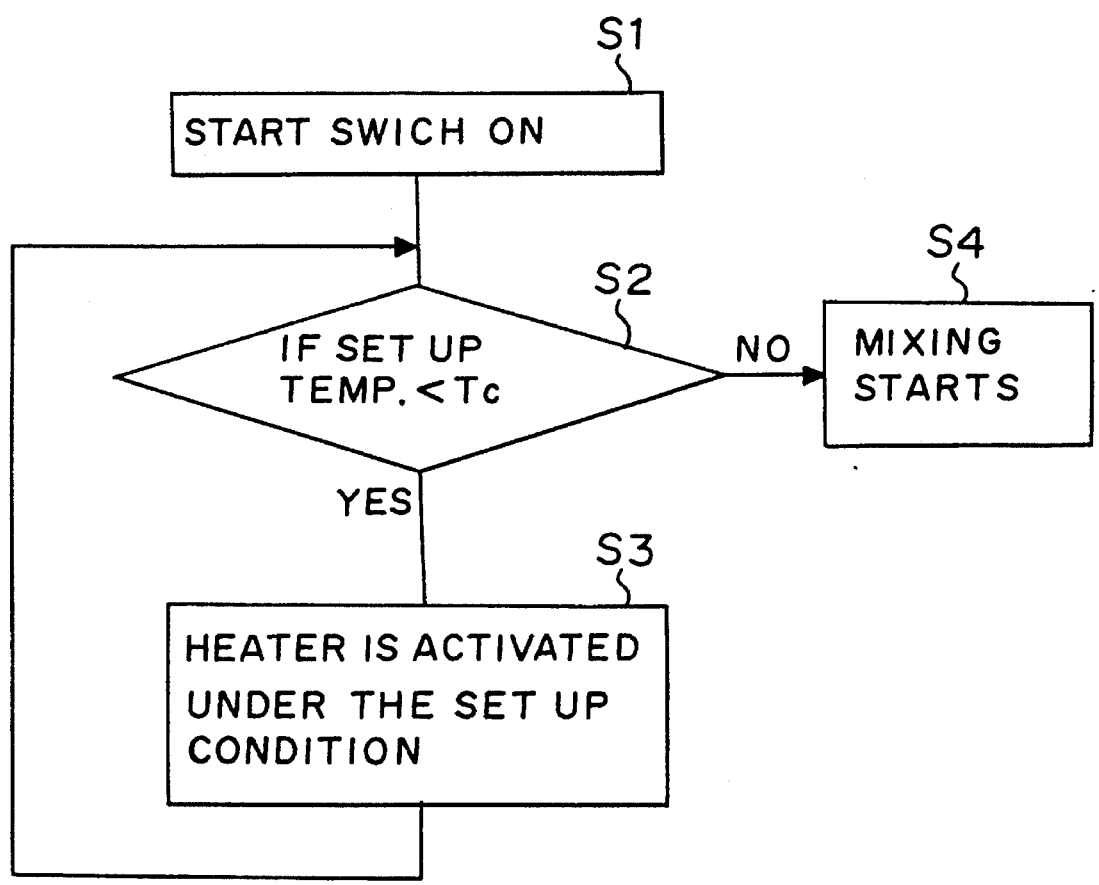
FIG. 3 shows a flow chart of a preheating means for the first embodiment of the bread baking device according to the present invention.

FIG. 3 shows the flow chart of the controlling action of the first embodiment of the bread baking device according to the present invention. The controlling action in the first embodiment is described in detail with reference to the block construction drawing shown in FIG. 2 and the flow chart shown in FIG. 3. In FIG. 3, when the start switch is pressed on (step S1), the preheat control program 52a (equivalent to the preheating control means) detects the oven temperature Ta by the oven sensor 117, when the water and raw ingredients are put in the bread baking vessel 13, and confirms whether the oven temperature Ta is below the pre-set temperature Tc or not (step S2). The pre-set temperature Tc is set at 23° C., for example.

When the oven temperature Ta is higher than the set temperature Tc, operation directly proceeds to the mixing process, without preheating (step S4).

When the oven temperature Ta is lower than the set temperature Tc, the preheating process is activated. The preheating control program 52a accesses the preheating operation data in the ROM 53, and controls the relay 30 of the oven heater 12 in accordance with the preset preheating operation (step S3).

Figure 4:
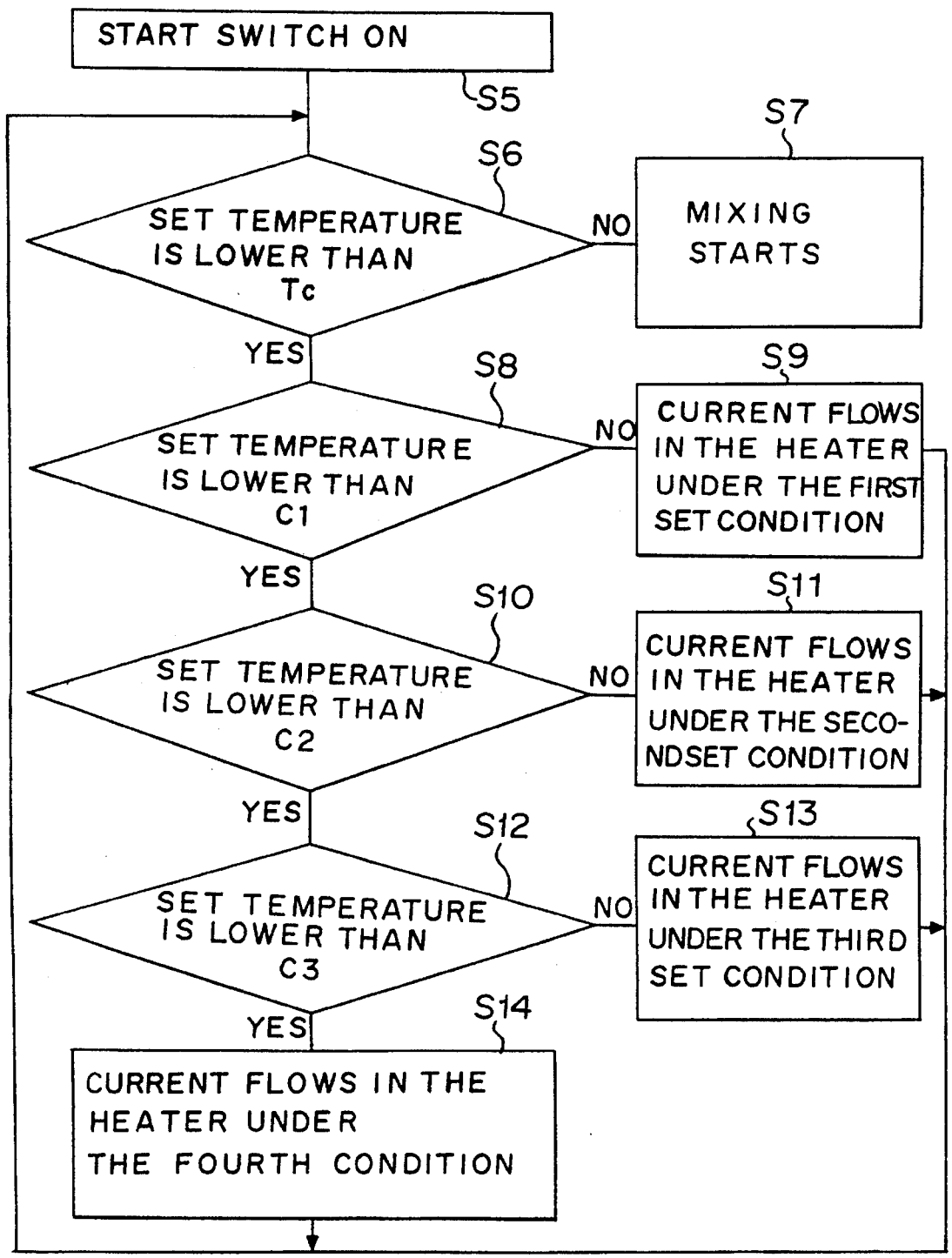
FIG. 4 shows another flow chart of the preheating means for the second embodiment of the bread baking device according to the present invention.

FIG. 4 shows a flow chart of the control action of the secondary embodiment of the bread baking device according to the present invention.

The control action of the secondary embodiment is described in detail with reference to the block construction diagram shown in FIG. 2 and the flow chart shown in FIG. 4 as follows.

When pressing on the start switch (step S5), the preheating control program 52a, stored in the microcomputer 18 which performs control of the system, receives the temperature Ta of the oven in which water and raw ingredients are placed, through the temperature sensor 117, and confirms whether or not the oven temperature Ta is below the pre-set temperature Tc or not (step 6).

If the oven temperature Ta is above the set temperature Tc, there is no need to preheat, and operation then proceeds directly to the mixing step (step 7).

If the oven temperature Ta is lower than the pre-set temperature Tc, the preheating process is activated.

If the oven temperature Ta is lower than the preset C1 (for example, 10° C., operation advances toward step S10. If the oven temperature Ta is higher than the preset C1, namely, if the oven temperature Ta is in the first temperature range between set temperature Tc and C1, the preheat control program 52a accesses to the corresponding data of the ROM 53, and sends current flow to the heater under the first preset condition C, namely, for example with 10% duty or with 30% duty and for 5 minutes) and controls the relay 30 of the oven heater 12 (step S9).

The operation then returns to step S6, and the microcomputer 18 confirms that the oven temperature is higher than the pre-set temperature Tc.

In step S10, if the oven temperature Ta is lower than the preset C2 (for example, 5° C.), operation advances toward step S12.

If the oven temperature Ta is higher than C2, namely, the oven temperature Ta is in the second temperature range, the preheat control program 52a accesses the corresponding data of the ROM 53, and controls the relay 30 of the oven heater 12, under the preset secondary set condition (namely under 20% duty ratio, or under 30% duty ratio and for 10 minutes). (Step S11.)

Thereafter, the operation returns to step S6, and confirms that the oven temperature Ta rose to above the set up temperature Tc.

In step S12, if the oven temperature Ta is lower than the preset temperature C3 (for example, 0° C.), operation advances to step S14 equivalent to the fourth temperature range, the preheat control program 52a accesses the corresponding data of the ROM 53, and send current flow to the heater under the fourth condition, (for example, sends current flow by duty ratio 40% or by the duty ratio 30% and for 20 minutes).

Then, operation returns to step S6, and confirms that the oven temperature Ta rises above the set temperature Tc.

If the oven temperature Ta is higher than C3, namely, the temperature Ta is in the third temperature range between C2 to C3, the preheat control program 52a accesses the corresponding data in ROM 53, and activates the heater under the preset third condition (namely, under the duty ratio 30% or under the duty ratio 30% and for 15 minutes). (Step S13.)

Operation then returns to step S6, and confirms that the oven temperature Ta rises above the pre-set temperature Tc.

By constructing the second embodiment as shown above, even if the oven temperature Ta is lower than the pre-set temperature, it becomes possible to consistently make breads of good quality, by usually keeping ingredients at the specified temperature Tc before the mixing step.

Figure 5:
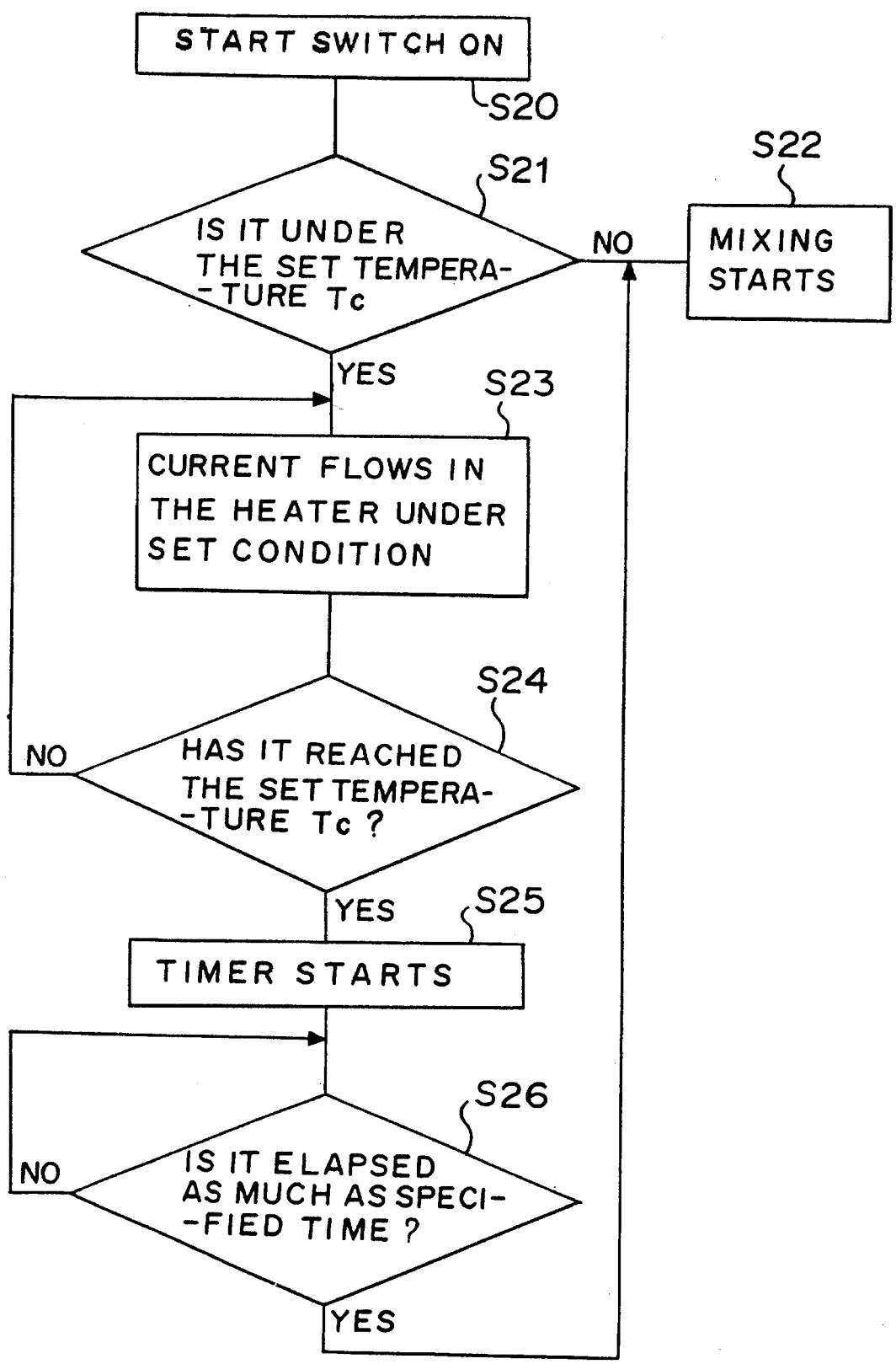
FIG. 5 shows a further differed flow chart of the preheating means for the third embodiment of the bread baking device according to the present invention.

FIG. 5 is the flow chart of the third embodiment of the bread baking device according to the present invention. The controlled action of this third embodiment is described in detail with reference to the block diagrams shown in FIG. 2 and the flow chart shown in FIG. 5 as follows.

In FIG. 5, by pushing the start button (step S20), the preheat controlling program 52a (preheat control means) of the microcomputer 18 controlling this system receives the oven temperature Ta through the oven temperature sensor 17 of the oven, where water and bread-making ingredients are placed, and confirms whether the oven temperature Ta is under the set temperature Tc or not (step S21).

If the oven temperature Ta is above the pre-set temperature Tc, there is no need to preheat, and the process immediately proceeds to the mixing step (step S22).

When the oven temperature is under the set temperature Tc, the preheating process is started, the preheating control program 52a accesses the corresponding data in ROM 53, and drives the relay 30 of the oven heater 12 according to specified preheating action (step S23). For example, sends current flow to the heater as shown in FIG. 4.

Operation then advances to step S24, and confirms that the oven temperature Ta rises to the pre-set temperature.

When the oven temperature rises to the pre-set temperature Tc, the timer starts to count time (step S25), and while looping for a pre-set adjusting period, the water and breadmaking ingredients put in the baking case are homogenized at the temperature.

After the adjusting time has elapsed, the operation advances to step S22 and the mixing step begins.

By constructing the third embodiment as described above, the bread materials are uniformly stabilized at the specified temperature Tc, and it becomes possible to make superior quality bread.

In addition, it is preferable to set the pre-set temperature Tc at a lower temperature rather than that under which gluten is well kneaded, in consideration of the fact that temperature rises by the frictional heat generated during kneading of the dough.

Furthermore, in each of the above-mentioned embodiments, as the means for preheating is not limited to this method, the preheat control program 52a activates also to supply heat from hot air obtainable from the hot air heater 27, the air fan 26, and the fan motor 25.

In this case, the preheating control program 52a controls the driving relay 33 of the air heater 27, and the driving relay 32 for the fan motor 25, in addition to controlling the driving relay 31.

In each of the embodiments, it may be possible to use the bread baking device for preparing dough.

As can be clearly understood from the above, in the bread making device according to this invention, the mixing step is not influenced by oven temperatures lower than the pre-set temperature, by the heating step for heating the oven temperature to the pre-set temperature by comparing the oven temperature with the pre-set temperature (for example 23° C.), before entering the mixing step, by applying the preheating control means. Accordingly, it becomes possible to produce bread having uniform quality.

Furthermore, in the aforementioned preheating control means, by classifying the temperature in the baking oven into a plurality of temperature ranges according to the degree of how much the temperature in the baking oven is lower than the pre-set temperature, and as low as the oven temperature is, by applying larger duty ratios and current flowing time in the heater, it becomes possible to rapidly raise the oven temperature to the pre-set temperature.

According to the present invention, the oven is heated to the pre-set temperature and is kept for a certain period of time before starting the mixing step. By these processes, the dough can be homogeneously warmed in its entirety, and accordingly, the fermentation proceeds in thorough uniformity.

What is claimed is:

1. A bread baking device comprising a bread baking case installed in a baking oven, and having a lid openably mounted on said baking oven, in which raw ingredients and water are kneaded to make and ferment a dough; detecting means for detecting the temperature in the baking oven; preheating control means for heating the oven to a pre-set temperature when said detected temperature in the baking oven is lower than a pre-set temperature, said preheating control means identifying a particular temperature range out of a plurality of temperature ranges which in the upper value is limited to the pre-set temperature and successively decreases; means for judging to which of said temperature ranges said detected temperature of the baking oven belongs; and heating means for determining the duty ratio of the current flow time period corresponding to each of said temperature ranges and heating said baking oven with the duty ratio or current flow time period corresponding to each of said temperature ranges.

2. The bread baking device as claimed in claims 1, wherein said preheating control means includes means for heating said baking oven to said pre-set temperature, maintaining said temperature of the oven for a prescribed time period, and then starting mixing of the dough.

3. A bread baking device provided with a bread baking case installed in a baking oven and with a lid openably mounted on said baking oven, in which dough is sequentially kneaded, fermented and baked, comprising temperature detecting means for detecting temperature in the oven before the start of kneading; preheating control means, which is provided with a first ROM for memorizing a plurality of temperature ranges of which the highest value is a predetermined temperature at which said kneading step start and which successively decrease; means for finding out a particular temperature range to which said detected temperature in the oven belongs; a second ROM for memorizing duty ratios of current flow for a heater corresponding to each temperature range, means for heating the oven up to said predetermined temperature with a duty ratio corresponding to said temperature range when said detected temperature in the oven is below the predetermined temperature.

4. A bread baking device as claimed in claim 3, wherein said preheating control means is further provided with a means for keeping the temperature of the heated oven at its temperature for a predetermined time period before starting to knead the dough.

* * * * *